(12) United States Patent
Ambeck-Madsen et al.

(10) Patent No.: US 11,798,297 B2
(45) Date of Patent: Oct. 24, 2023

(54) CONTROL DEVICE, SYSTEM AND METHOD FOR DETERMINING THE PERCEPTUAL LOAD OF A VISUAL AND DYNAMIC DRIVING SCENE

(71) Applicants: TOYOTA MOTOR EUROPE, Brussels (BE); UCL BUSINESS PLC, London (GB)

(72) Inventors: Jonas Ambeck-Madsen, Brussels (BE); Ichiro Sakata, Brussels (BE); Nilli Lavie, London (GB); Gabriel J. Brostow, London (GB); Luke Palmer, London (GB); Alina Bialkowski, London (GB)

(73) Assignees: TOYOTA MOTOR EUROPE NV/SA, Brussels (BE); UCL BUSINESS PLC, London (GB)

( * ) Notice: Subject to any disclaimer, the term of this patent is extended or adjusted under 35 U.S.C. 154(b) by 0 days.

(21) Appl. No.: 16/495,160

(22) PCT Filed: Mar. 21, 2017

(86) PCT No.: PCT/EP2017/056726
§ 371 (c)(1),
(2) Date: Sep. 18, 2019

(87) PCT Pub. No.: WO2018/171875
PCT Pub. Date: Sep. 27, 2018

(65) Prior Publication Data
US 2020/0143183 A1    May 7, 2020

(51) Int. Cl.
*G06V 20/59*    (2022.01)
*G06V 20/58*    (2022.01)
(Continued)

(52) U.S. Cl.
CPC .......... *G06V 20/597* (2022.01); *G06F 18/213* (2023.01); *G06F 18/214* (2023.01);
(Continued)

(58) Field of Classification Search
CPC .......... G06K 9/00214; G06K 9/00791; G06K 9/00798; G06K 9/00805; G06K 9/00845;
(Continued)

(56) References Cited

U.S. PATENT DOCUMENTS 8,442,309 B2 * 5/2013 Ranganathan ....... G06K 9/6231
382/159
9,489,635 B1 * 11/2016 Zhu ...................... G06K 9/6282
(Continued)

OTHER PUBLICATIONS

N. Li and C. Busso, "Predicting perceived visual and cognitive distractions of drivers with multimodal features", IEEE Transactions on Intelligent Transportation Systems, vol. 16, No. 1, pp. 51-65, Feb. 2015. (Year: 2015).*
(Continued)

*Primary Examiner* — Wesley J Tucker
*Assistant Examiner* — Han Hoang
(74) *Attorney, Agent, or Firm* — Sughrue Mion, PLLC

(57) ABSTRACT

The invention relates to a control device (1) for a vehicle for determining the perceptual load of a visual and dynamic driving scene. The control device is configured to: •receive a sensor output (101) of a sensor (3), the sensor (3) sensing the visual driving scene, •extract a set of scene features (102) from the sensor output (101), the set of scene features (102) representing static and/or dynamic information of the visual driving scene, •determine the perceptual load (104) of the set of extracted scene features (102) based on a predetermined load model (103), the load model (103) being predetermined based on reference video scenes each being labelled with a load value, •map the perceptual load to the sensed driving and •determine a spatial and temporal intensity distribution
(Continued)

of the perceptual load across the sensed driving scene. The invention further relates to a vehicle, a system and a method.

26 Claims, 7 Drawing Sheets

(51) Int. Cl.
G06V 20/56 (2022.01)
G06V 20/64 (2022.01)
G06F 18/213 (2023.01)
G06F 18/214 (2023.01)
G06F 18/241 (2023.01)
G06V 10/82 (2022.01)
G06V 10/44 (2022.01)
G06F 18/25 (2023.01)

(52) U.S. Cl.
CPC .......... G06F 18/241 (2023.01); G06V 10/454 (2022.01); G06V 10/82 (2022.01); G06V 20/56 (2022.01); G06V 20/58 (2022.01); G06V 20/588 (2022.01); G06V 20/653 (2022.01); G06F 18/253 (2023.01)

(58) Field of Classification Search
CPC .. G06K 9/4628; G06K 9/6232; G06K 9/6256; G06K 9/6268; G06K 9/629; G08G 1/16
See application file for complete search history.

(56) References Cited

U.S. PATENT DOCUMENTS

2004/0088095 A1    5/2004  Eberle et al.
2015/0153184 A1*  6/2015  Mudalige ............ G06K 9/2054
                                                           701/523
2016/0034786 A1*  2/2016  Suri ..................... G06K 9/6256
                                                           382/159

OTHER PUBLICATIONS

Zeiler, M.D., Fergus, R.: Visualizing and understanding convolutional networks. In: The European Conference on Computer Vision (ECCV) (2014) (Year: 2014).*

D. Tran, L. Bourdev, R. Fergus, L. Torresani and M. Paluri, "Learning spatiotemporal features with 3D convolutional networks", Proc IEEE Int. Conf. Comput. Vis. (ICCV), pp. 4489-4497, Dec. 2015. (Year: 2015).*

7. C. E. Rasmussen and C. K. I. Williams, Gaussian Processes for Machine Learning, MIT Press, 2006. (Year: 2006).*

A. Dubey, N. Naik, D. Parikh, R. Raskar, and C. A. Hidalgo. Deep learning the city: Quantifying urban perception at a global scale. In European Conference on Computer Vision, pp. 196-212. Springer, 2016. (Year: 2016).*

Evona Teh, Samantha Jamson, Oliver Carsten, Hamish Jamson, Temporal fluctuations in driving demand: The effect of traffic complexity on subjective measures of workload and driving performance, Transportation Research Part F: Traffic Psychology and Behaviour, vol. 22, 2014 (Year: 2014).*

Palasek, P., Lavie, N., & Palmer, L. (2019). Attentional demand estimation with attentive driving models. BMVC. (Year: 2019).*

Marciano, Hadas, and Yaffa Yeshurun. "Perceptual load in different regions of the visual scene and its relevance for driving." Human factors 57.4 (2015): 701-716. https://journals.sagepub.com/doi/abs/10.1177/0018720814556309 (Year: 2015).*

Nanxiang Li et al., "Predicting Perceived Visual and Cognitive Distractions of Drivers With Multimodal Features," IEEE Transactions on Intelligent Transportation Systems, Feb. 1, 2015, pp. 51-65, vol. 16, No. 1.

Matthew D. Zeiler et al., "Visualizing and Understanding Convolutional Networks," ECCV, 2014, pp. 818-933, Part 1, LNCS 8689.

Du Tran et al., "Learning Spatiotemporal Features with 3D Convolutional Networks," IEEE International Conference on Computer Vision, 2015, pp. 4489-4497.

Abhimanyu Dubey et al., "Deep Learning the City: Quantifying Urban Perception at a Global Scale," ECCV, 2016, pp. 196-212, Part 1, LCNS 9905.

Lorenzo Porzi et al., "Predicting and Understanding Urban Perception with Convolutional Neural Networks," Multimedia, Oct. 13, 2015, pp. 139-148.

Gillian Murphy et al., "Perceptual Load Induces Inattentional Blindness in Drivers," Applied Cognitive Psychology, Mar. 10, 2016, pp. 479-483, vol. 30, No. 3.

Written Opinion of the International Searching Authority of PCT/EP2017/056726 dated Dec. 12, 2017.

International Search Report of PCT/EP2017/056726 dated Dec. 12, 2017.

* cited by examiner

CONTROL DEVICE, SYSTEM AND METHOD FOR DETERMINING THE PERCEPTUAL LOAD OF A VISUAL AND DYNAMIC DRIVING SCENE

CROSS REFERENCE TO RELATED APPLICATIONS

This application is a National Stage of International Application No. PCT/EP2017/056726 filed Mar. 21, 2017.

FIELD OF THE DISCLOSURE

The present disclosure is related to a control device, system and method for a vehicle for determining the perceptual load of a visual and dynamic driving scene, in particular of an uncontrolled, dynamically changing visual scene that the driver must perceive to carry out the driving task. More in particular, the present disclosure enables to determine the spatial and temporal intensity distribution of the perceptual load across the sensed driving scene.

BACKGROUND OF THE DISCLOSURE

The ability to recognise perceptual load of the uncontrollable dynamic visual environment in which vehicles are driven and changes hereof including sudden surges, could significantly improve driving safety by providing the basis for new designs and strategies for use of warning signals. It could also set a standard against which the usefulness of other measures of detecting driver attention and engagement can be assessed, e.g. physiological measures such as pupil or EEG measurements. Further it could also apply to designing optimum strategies for vehicle-to-driver interactions for highly automated vehicles, for example but not limited to the case of so-called take-over-requests, where the automatic control system requests a driver to re-take control over vehicle operation.

Methods are known which model safety critical events after they have occurred, i.e. once the driver e.g. steers or brakes to avoid a collision.

However, it remains desirable to anticipate critical events by considering one of the root causes—inattention due to the level of information load from the visual scene. For example, it is well established in cognitive neuroscience that the amount of load on the brain is critical to determining whether a task can be fully perceived, with high levels of perceptual load causing inattentional blindness—a phenomenon where a person looks but "fails to see". This can have serious consequences in driving, where failing to notice changes in the visual environment can result in accidents. On the other hand very low levels of load may imply the risk that the driver's concentration deteriorates.

Numerous laboratory studies have looked at the effect of load on performing laboratory tasks of attention (for example visual search), as e.g.

Lavie, N. and Cox, S. (1997): "On the efficiency of visual selective attention: Efficient visual search leads to inefficient distractor rejection", Psychological Science, 8(5): 395-396, Beck, D. M. and Lavie, N. (2005): "Look here but ignore what you see: Effects of distractors at fixation", Journal of Experimental Psychology: Human Perception and Performance, 31(3):592-607, Cartwright-Finch, U. and Lavie, N. (2007): "The role of perceptual load in inattentional blindness", Cognition, 102(3):321-340, or Roper, Z. J. J., Cosman, J. D., and Vecera, S. P. (2013): "Perceptual load corresponds with factors known to influence visual search", Journal of Experimental Psychology: Human Perception and Performance, 39(5):1340-1351.

A few studies also tested the effects of laboratory manipulations of perceptual load on people's performance of a driving simulator task, as e.g. Marciano, H., and Yeshurun, Y. (2011). "The effects of perceptual load in central and peripheral regions of the visual field". Vis. Cogn. 19, 367-391.doi: 10.1080/13506285.2010.537711.

Marciano, H., and Yeshurun, Y. (2011). "The effects of perceptual load in central and peripheral regions of the visual field". Vis. Cogn. 19, 367-391. doi: 10.1080/13506285. 2010.537711, Marciano, H., and Yeshurun, Y. "Perceptual load in central and peripheral regions and its effects on driving performance: Advertizing billboards", Work: A Journal of Prevention, Assessment and Rehabilitation, 2012, 41, 3181-3188, Redenbo, S. J., and Lee, Y. C. (2009). "Effects of cognitive and perceptual loads on driver behavior". Transportation Research Record, 2138, 20-27, and Tan, P. H., and Lee, Y. C. (2009). "Effect of perceptual and cognitive loads on drivers' attention and resistance to distractors". In Proceedings of the Human Factors and Ergonomics Society 53rd Annual Meeting (pp. 1739-1743). Santa Monica, Calif.: Human Factors and Ergonomics Society.

A number of approaches have been used for estimating general driver load (known as workload) including:

Subjective measures such as through self-report and self-rating scales;

Physiological measures including measures of brain activity (e.g. task-related brain potentials which can be sensed through EEG), heart activity (e.g. heart rate), eye activity (e.g. pupil dilation and blink rate), and stress activity (e.g. through galvanic skin response);

Task and performance-based measures such as reaction times and error rates;

Behavioural measures such as speech disfluencies.

For example, US2007063854 (A1) refers to a method for adaptive driver workload estimation. A subjective assessment of a driver workload is received from a vehicle driver. A stream of sensor input data is collected from one or more sensors for sensing e.g. gaze position, vehicle speed, steering angle, etc., in response to receiving the subjective assessment. A machine learning algorithm is applied to a driver workload estimate model based on the stream of sensor input data and the subjective assessment. The result is an updated driver workload estimate model.

However, the known methods consider work load as a whole, which amalgamates several sources making it impossible to disentangle the contribution of perceptual load. Yet it is perceptual load that is known to lead to inattentional blindness while other sources of workload may not always have the same impact on driver perception, inattention and in particular their ability to detect safety-critical events. Therefore a method to estimate perceptual load could improve the prediction of a driver's detection ability and ability to assess the situation at hand over the existing methods. Furthermore these methods are limited to measurement through active driver interaction.

As a further example, clothing style recognition has been investigated by Kiapour et al.: "Hipster wars: Discovering elements of fashion styles" in ECCV, 2014. Kiapour et al regress from image descriptors of clothed people to style attributes such as 'hipster', 'bohemian', and 'preppy'.

Furthermore Dubey et al.: "Deep learning the city: Quantifying urban perception at a global scale", ECCV, Springer, 2016, use outdoor street-level imagery to predict the perceived value of 6 attributes of the urban area, such as safety and liveliness, and introduce the use of deep convolutional architectures to map from images to the subjective attributes of interest.

The attribute prediction work as cited so far deals exclusively with estimating attributes of static images though and does not consider the perceptual demand of a driving situation which is related to the motion of objects and features through time (e.g. the motion of other cars on the road).

However, no work has yet been reported related to measuring and recognizing the level of perceptual load during driving directly from the (natural) visual scene (and as related to drivers' judgements), with a non-intrusive recognition method that can be implemented in the car for real-time analysis.

Anyway, such a non-intrusive recognition method is necessary to prevent affecting the safety of the driver. This rules out the use of many physiological measures which would require monitoring devices that would interfere with driving, in addition to the difficulty of isolating the physiological effects of load from other noise signals. Task and performance-based measures from the primary task of driving have been found to be insufficient to model the cognitive or perceptual load levels, and a secondary task would have to be given which could interfere or distract the driver.

SUMMARY OF THE DISCLOSURE

Currently, it remains desirable to provide a control device and method for determining the perceptual load of driving directly from the visual driving scene, in particular such that said determination can be applied and integrated into the vehicle in a completely non-intrusive manner, i.e. without requiring any measures of the driver while they drive. More in particular it remains desirable to provide a control device and method for detecting temporal and spatial portions of the driving scene which comprise an increased perceptual load.

The invention resolves these issues by estimating the perceptual load of driving directly from the driving scene surrounding the car (and without requiring intrusive measures of the driver behaviour).

Therefore, according to the embodiments of the present disclosure, a control device for a vehicle for determining the perceptual load of a visual and dynamic driving scene is provided. The control device being configured to:
  receive sensor output of a sensor, the sensor sensing the visual driving scene,
  extract a set of scene features from the sensor output, the set of scene features representing static and/or dynamic information of the visual driving scene,
  determine the perceptual load of the extracted set of scene features based on a predetermined load model. The load model is predetermined based on reference video scenes each being labelled with a load value,
  map the perceptual load to the sensed driving scene, and determine a spatial and temporal intensity distribution of the perceptual load across the sensed driving scene.

By providing such a control device, scene features can be extracted directly from the visual driving scene. Furthermore the perceptual load of the set of extracted scene features can be determined. By labelling reference video scenes with e.g. crowd sourced load values, i.e. by combining visual scene information with crowd-sourced load labels, the control device can correctly learn, classify and identify the perceptual load in driving from the set of scene features extracted from a visual driving scene using a data-driven approach. While describing and representing video content has been researched for many decades for tasks including action recognition, event detection, and video retrieval, this is the first time it has been used for recognizing perceptual load in driving.

Furthermore, by providing such a control device, the perceptual load can be determined based on a load model which is predetermined based on reference scenes or reference data each being labelled with a load value. Accordingly, the load model can be trained by reference video scenes with corresponding load values. The mapping between reference scenes and the respective load values, i.e. the labelling, may involve crowd sourcing, i.e. may be based on the evaluations of test persons. In other words, this mapping may be human based, in order to integrate information about the way humans experience perceptual load of the reference video scenes.

The reference video scenes desirably provide a set of exemplary visual driving scenes, e.g. a set of more than 1000 scenes, e.g. 2300.

Accordingly, it is possible that the load model and hence the control device can learn the perceptual load of the reference scenes as related to the judgments of the crowd-sourced drivers (i.e. test persons). Based on this learnt information, the load model can be trained, in order to develop a general mapping function between a set of scene features (as an input of the mapping function) and resulting perceptual load (as an output of the mapping function). In other words, the load model becomes capable of determining the perceptual load of the visual driving scene, via its set of extracted scene features.

The determined perceptual load of the visual driving scene is desirably also expressed as a load value in the same format as the load values with which the reference video scenes have been labelled. The perceptual load may also be expressed as a set of values or a data set.

The load value may be expressed by one value, in particular a natural number, e.g. between 10 and 45, wherein for example 25 constitutes a mean perceptual load.

By mapping the perceptual load to the sensed driving scene, it becomes possible to determine a relation between the determined load and the single portions (in the following also referred to as spatial and temporal extracts) of the driving scene. Accordingly, based on said mapping it becomes possible to determine a spatial and temporal intensity distribution of the perceptual load across the sensed driving scene. By such, the disclosure enables to detect spatial and temporal regions of the driving scene which comprise an increased perceptual load. Such a portion may for instance show a pedestrian crossing the road.

It is noted that the "sensed driving scene" corresponds to the sensor output of the sensor which senses the driving scene.

It is further noted that, since the perceptual load is determined based on a load model trained by humans, it indeed corresponds to a subjective human perception of the video scene. However, the determination step itself constitutes a technical feature (e.g. a computer algorithm) of the disclosure and the perceptual load is desirably a deterministic (i.e. objective) result of said determination step.

The visual and dynamic driving scene desirably corresponds to a driver's perspective. Hence, it desirably includes an outdoor visual driving scene, i.e. a scene of the environment of the vehicle, in particular in front of the vehicle (seen through the front window) and left and right to the vehicle (seen through the frontal side windows). It desirably further includes the driving mirrors. Moreover, it desirably includes the control panel of the vehicle, e.g. any screens and displays. In other words, it desirably includes all visual elements which influence the load of the driver related to the driving task.

The sensor may be an optical sensor, in particular at least one digital camera. The sensor is desirably oriented in the driving direction of the vehicle, in particular such that it senses the road in front of the vehicle. In addition, the sensor or further sensors may be oriented to the left and/or right side of the vehicle, in particular to sense the road left and/or right of the vehicle. Alternatively or additionally, also other sensor types may be used, e.g. radar (i.e. radio detection), x-ray and/or any acoustic (e.g. supersonic) sensors.

The sensor output may be a digital video or digital stream, in particular of a predetermined length (in the following also referred to as "video snippet"). A "sliding window" approach may be used to provide a continuous output of the perceptual load. Accordingly, a perceptual load value may be output for every frame of the video.

The disclosed control device may in particular be employed in driver support systems to indicate when the level of perceptual load on the road reaches a predetermined threshold that may require a warning signal to the driver to pay attention to the road.

Further, the control device may also be employed in the context of driver support systems, for example but not limited to the case of sudden brakes initiated by the driver support system. Also in such situations it is important for the automatic control system to be able to reliably determine the perceptual load of the driving scene.

The disclosed control device may also in particular be employed in the context of vehicle-to-driver interactions for highly automated vehicles, for example but not limited to the case of so-called take-over-requests, where the automatic control system requests a driver to re-take control over vehicle operation. In such situations it is important for the automatic control system to be able to reliably determine the perceptual load of the driving scene related to the driving task. A further exemplary case would be that the automatic control system takes over driving control, e.g. in case the system recognizes that the determined perceptual load exceeds a specific threshold.

The load model may comprise a mapping function between sets of scene features extracted from the reference video scenes and the load values.

Accordingly, as also explained above, the load model may be trained by mapping a set of scene features extracted from a reference video scene to a corresponding load value. Since this mapping may form a general regression/mapping function, the load model becomes capable of determining the perceptual load of any sensed visual driving scene, i.e. of its set of extracted scene features.

The load model may be configured to map a set of scene features to a perceptual load value.

Hence, as also explained above, the load model can map a set of scene features extracted from any sensed visual driving scene to a perceptual load value. Accordingly, the perceptual load of said driving scene can be determined.

The load model may be a regression model or a classification model between the sets of scene features extracted from the reference video scenes and the load values. In case of a classification model, it may be useful to additionally create load categories from the load values, e.g. get a model to classify high vs low load traffic scenes.

The mapping of the perceptual load to the sensed driving scene may comprise determining the relevance of a predetermined spatial and temporal extract of the driving scene, desirably of a plurality of extracts, to the perceptual load value of the sensed scene. The determined relevance may be mapped to said predetermined spatial and temporal extract. Such a spatial and temporal extract may be a portion of the sensed driving scene. In particular, said relevance determination may be done for a plurality of extracts of the sensed driving scene, which are at different positions in the sensed driving scene. Accordingly, it is possible to determine the relevance of each spatial and temporal portion (i.e. extract) of the sensed driving scene. A determined relevance may be expressed as a value (e.g. a load value) which is mapped to the respective extract.

The determination of the relevance of a predetermined spatial and temporal extract may be done by occluding the predetermined spatial and temporal extract in the sensed driving scene. The determined perceptual load of the original sensed driving scene (i.e. as sensed by the sensor) may then be compared to the determined perceptual load of the sensed driving scene having the spatial and temporal extract occluded.

The determination of the spatial and temporal intensity distribution may comprise assembling the plurality of predetermined spatial and temporal extracts, such that the original sensed driving scene is reconstructed. In other words, the determined relevances may be combined such that an overall spatial and temporal intensity distribution of the perceptual load across the sensed driving scene can be obtained. Desirably, this assembling includes interpolating the extracts to the full resolution of the original sensed driving scene. Accordingly, since the spatial and temporal resolution of the original sensed driving scene may be higher than that one of the assembled extracts, the reconstruction may comprise an interpolation (e.g. linear interpolation), in order to obtain the original resolution, in particular to fill missing spatial and/or temporal portions between the extracts.

It is generally noted that determination according to the disclosure, e.g. "determination of the relevance" or "determination of the perceptual load", may also be regarded as an estimation, as the determined result might not be exact (e.g. in view of the real driving scene).

The determination of the load values of the reference video scenes may be human based, in particular based on crowdsourcing. Accordingly, the load values may be evaluated directly by humans (i.e. test persons).

For example, the determination of the load values may be based on a pairwise ranking procedure, i.e. on an algorithm which estimates ratings from pairwise comparisons, in particular based on the TrueSkill algorithm.

Accordingly, a known algorithm as e.g. the TrueSkill algorithm may be applied, in order to rank the reference video scenes with regard to their perceptual load. In order to do so, test persons may evaluate pairs of reference video scenes, in order to decide which of the two reference video scenes has the higher perceptual load. By presenting a multitude of different pairs to a plurality of test persons, an overall ranking between all reference video scenes can be determined. This overall ranking may be expressed as the load values, with which the reference video scenes have been labelled. In other words, the overall ranking may be expressed as the load values which are then assigned to the reference video scenes.

The TrueSkill algorithm is also described in Herbrich, R., Minka, T., and Graepel, T. (2006): "Trueskill: A bayesian skill rating system", Advances in Neural Information Processing Systems, pages 569-576.

Instead of the TrueSkill algorithm, also the Elo model (Elo, A. (1978): "The Rating of Chessplayers, Past and Present", Arco. ISBN 0-668-04721-6), the Glicko system (Glickman, Mark E., (1999): "Parameter estimation in large dynamic paired comparison experiments", Applied Statistics, 48, 377-394), or the BTL (Bradley Terry Luce) algorithm for converting pairwise comparisons to ratings may be applied.

Instead of a pairwise ranking procedure, also another number of reference video scenes may be compared in the ranking procedure, e.g. a triplet, four, or more reference video scenes.

It is also possible that the control device is configured to continuously train the load model by monitoring the driver during the driving scene, in particular the driver's responses to the visual scene and/or acoustic signals emitted by the vehicle. Accordingly, the control device may further optimize the load model "on the go", i.e. while the vehicle is driven. For this purpose, the driver may be monitored, e.g. by one or more cameras, etc., in order to measure the physiological response (e.g. pupil dilation) of the driver during driving. In particular, the driver's responses to acoustic signals emitted by the vehicle may be measured. Further, additional response time and the response behavior, including the driving behavior, such as e.g. sudden braking, steering, etc. may be monitored in conjunction.

A monitored behavior of the driver during the driving scene not matching the determined perceptual load may serve to on-line up-date said mapping function. Accordingly, based on the monitored information regarding the behavior of the driver during the driving scene it may be judged, whether the determined load appears to be correct or not, and the load model may be optimized based on the judgement. For example, in case the determined load value indicates a low perceptual load of the driving scene, but the driver's behavior suggests a high perceptual load (e.g. due to a low pupil response and a hectic reaction like sudden braking, steering, etc.), the load model may be adapted accordingly. Hence, any situations not matching previous results of the mapping function (i.e. the load model) may serve to on-line up-date said mapping function.

Furthermore, it is also possible that any driving scenes that already have been monitored by the sensor may be used as further reference video scenes, with which the load model may be trained.

The set of scene features may comprise a range of spatio-temporal features, the set of scene features being in particular described in vector form.

The set of scene features may comprise improved dense trajectory (iDT) features and/or 3-dimensional convolutional neural network (C3D) features.

Improved dense trajectory (iDT) features are also described in Wang, H. and Schmid, C. (2013): "Action recognition with improved trajectories", IEEE International Conference on Computer Vision, Sydney, Australia.

Convolutional 3D (C3D) features are also described in Tran, D., Bourdev, L., Fergus, R., Torresani, L., and Paluri, M. (2015): "Learning spatiotemporal features with 3d convolutional networks", IEEE International Conference on Computer Vision, pages 4489-4497.

The load model may be a linear regression model, a kernel regression model, a support vector regression model, a ridge regression model, a lasso regression model, or a random forest regression model. The load model may be in particular a multi-channel non-linear kernel regression model.

The load model may be a linear regression model, wherein the set of scene features (in particular of the sensed driving scene) being an input scene feature vector x is mapped to the perceptual load being an output perceptual load value $y=f(x)$ through a linear mapping function $f(x)= w^T x + b = w_1 * x_1 + w_2 * x_2 + w_3 * x_3 \ldots + b$, the function being a weighted sum of the input dimension values of the feature vector x, wherein weighted parameters w are assigned to each dimension value in the feature vector x and a bias term b centres the output at a particular value.

Alternatively the load model may be a multi-channel non-linear kernel regression model, where the mapping function is $f(x) = w^T \phi(x) + b$, wherein $\phi(x)$ is a transformation function of the input feature vectors to a non-linear kernel space.

The disclosure further relates to a vehicle comprising a control device as described above.

The vehicle may further comprise a sensor configured to sense the visual driving scene, the sensor being in particular an optical sensor, more in particular at least one digital camera.

Accordingly, also a plurality of sensors may be used, in order to sense (i.e. perceive) the driving scene. For example, two sensors might be used, in order to obtain three dimensional information of the driving scene, as well as surround view type sensor configuration, and any combination hereof.

The vehicle may be configured for a at least partially automated driving control. The control device may be used in a pre-processing step of the driving control to identify portions with increased perceptual load in the sensed driving scene based on which the automated driving is controlled.

The vehicle may comprise hardware and/or software resources configured for the at least partially automated driving control.

Said hardware and/or software resources may be allocated to process the portions with increased perceptual load in prioritized manner. Accordingly, the portions of the sensed driving scene implying an increased perceptual load (when compared to the other portions of the same driving scene implying a lower perceptual load) may be processed (i.e. considered) first. In this way the (limited) hardware and/or software resources may be used efficiently. Of course, the prioritized processing of portions with increased perceptual load does not imply that other portions are not processed at all. However, these other portions may be processed with a lower priority, e.g. with regard to processing time and/or used processing power.

The vehicle may comprise a human-machine-interface configured to output to human the portions with increased perceptual load. Accordingly, the human-machine-interface may contribute to a safe driving of the driver. For example, the human-machine-interface may mark the portions with increased perceptual load but may alternatively or additionally also highlight other regions in the sensed driving scene. Hence, such other regions which may also be relevant for safe driving may be drawn to the attention of the driver who otherwise might disregard them. Additionally or alternatively, the human-machine-interface may be configured for so-called take-over-requests, where the automatic control system requests a driver to re-take control over vehicle operation. In such situations it is important for the automatic control system to be able to reliably determine the perceptual load of the driving scene related to the driving task. A further exemplary configuration would be that the automatic control system takes over driving control, e.g. in case the system recognizes that the determined perceptual load exceeds a specific threshold.

The disclosure further relates to a system for a vehicle for determining the perceptual load of a visual and dynamic driving scene. The system comprising:
a control device, in particular as described above, and
a server, configured to determine the load model.

The server may be configured to:
store a plurality of reference video scenes,
provide means for labelling the reference video scenes with load values,
extract a set of scene features from each reference video scene, and
determine the load model based on a regression analysis configured to determine a mapping function between the set of scene features extracted from the respective reference video scenes and the load values.

Accordingly, the server may be configured to develop the load model. The developed load model may then be transferred to the control device of the vehicle, in order to serve as a mapping function between sensed driving scenes and their corresponding perceptual load. The load model may further be trained on the server after its initial development. Accordingly, the load model of the control device may be updated later.

The server may be configured to:
provide means for a human based load rating of the reference video scenes. In particular the load rating may be based on crowdsourcing, wherein the load values are determined based on the human based load rating.

The server may be configured such that the load rating is based on a pairwise ranking procedure, in particular based on the TrueSkill algorithm.

Accordingly, the server may be used to rank the reference video scene by test persons, wherein e.g. the TrueSkill algorithm might be applied, in order to obtain an overall ranking between all reference video scenes. The server may provide corresponding software.

The disclosure further relates to a method of determining the perceptual load of a visual and dynamic driving scene. The method comprising the steps of:
receiving a sensor output of a sensor, the sensor sensing the visual driving scene,
extracting at least a set of scene features from the sensor output, the set of scene features representing static and/or dynamic information of the visual driving scene,
determining the perceptual load of the set of extracted scene features based on a predetermined load model. The load model is predetermined based on reference video scenes each being labelled with a load value,
mapping the perceptual load to the sensed driving scene, and
determining a spatial and temporal intensity distribution of the perceptual load across the sensed driving scene.

The load model may comprise a mapping function between sets of scene features extracted from the reference video scenes and the load values.

The load model may map a set of scene features to a perceptual load value.

The load model may be a regression model or a classification model between the sets of scene features extracted from the reference video scenes and the load values.

The determination of the load values of the reference video scenes may be human based, in particular based on crowdsourcing.

The determination of the load values may be based on a pairwise ranking procedure, in particular based on the TrueSkill algorithm.

The load model may be continuously trained by monitoring the driver during the driving scene, wherein a monitored behavior of the driver during the driving scene not matching the determined perceptual load may serve to on-line up-date said mapping function.

The set of scene features may comprise a range of spatio-temporal features, the set of scene features being in particular described in vector form.

The set of scene features may comprise improved dense trajectory (iDT) features and/or 3-dimensional convolutional neural network (C3D) features.

The load model may be a linear regression model, a kernel regression model, a support vector regression model, a ridge regression model, a lasso regression model, a random forest regression model, or a multi-channel non-linear kernel regression model.

The load model may be a linear regression model, wherein the set of scene features (in particular of the sensed driving scene) being an input scene feature vector x is mapped to the perceptual load being an output perceptual load value $y=f(x)$ through a linear mapping function $f(x)=w^Tx+b=w_1*x_1+w_2*x_2+w_3*x_3 \ldots +b$, the function being a weighted sum of the input dimension values of the feature vector x, wherein weighted parameters w are assigned to each dimension value in the feature vector x and a bias term b centres the output at a particular value.

Alternatively the load model may be a multi-channel non-linear kernel regression model, where the mapping function is $f(x)=w^T\phi(x)+b$, wherein $\phi(x)$ is a transformation function of the input feature vectors to a non-linear kernel space.

The sensor may be an optical sensor, in particular at least one digital camera.

In the method a server may carry out the following steps:
store a plurality of reference video scenes,
provide means for labelling the reference video scenes with load values,
extract a set of scene features from each reference video scene, and
determine the load model based on a regression analysis which determines a mapping function between the sets of scene features extracted from the respective reference video scenes and the load values.

The server may provide means for a human based load rating of the reference video scenes. In particular the load rating may be based on crowdsourcing, wherein the load values are determined based on the human based load rating.

The load rating may be based on a pairwise ranking procedure, in particular based on the TrueSkill algorithm.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
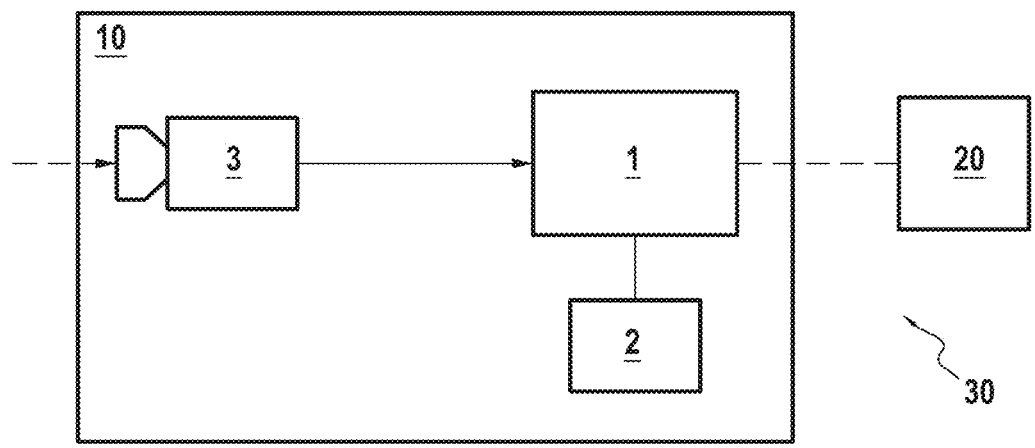
FIG. 1 shows a block diagram of a system with a control device according to embodiments of the present disclosure.

FIG. 1 shows a block diagram of a system 30 with a control device 1 according to embodiments of the present disclosure.

The control device 1 is connected to or comprises data storage 2. Said data storage may be used to store a load model. As described in the following, said load model is used to determine the perceptual load of a visual driving scene.

The control device 1 may additionally carry out further functions in the vehicle 10. For example, the control device may also act as the general purpose ECU (electronic control unit) of the vehicle. The control device 1 may comprise an electronic circuit, a processor (shared, dedicated, or group), a combinational logic circuit, a memory that executes one or more software programs, and/or other suitable components that provide the described functionality.

The control device 1 is further connected to an optical sensor, in particular a digital camera 3. The control device 1 and the digital camera may be comprised by a vehicle 10. The digital camera 3 is configured such that it can record a visual driving scene of the vehicle 10. The digital camera is desirably oriented in the driving direction of the vehicle, i.e. such that it records in particular the road in front of the vehicle. It is also possible to use several cameras 3. Accordingly, it may also be reasonable to use several sensors (e.g. cameras), in order to cover the complete field of view of the driver.

The output of the digital camera 3, in particular a recorded video stream, is transmitted to the control device 1. Desirably, the output is transmitted instantaneously, i.e. in real time or in quasi real time. Hence, the perceptual load of the recorded driving scene can also be determined by the control device in real time or in quasi real time.

The system 30 may comprise additionally a server 20. The server 20 is used to train and eventually update the load model. For this purpose, the control device 1 may be connectable to the server. For example the control device 1 may be connected to the server 20 via a wireless connection. Alternatively or additionally the control device 1 may be connectable to the server 20 via a fixed connection, e.g. via a cable.

Figure 2:
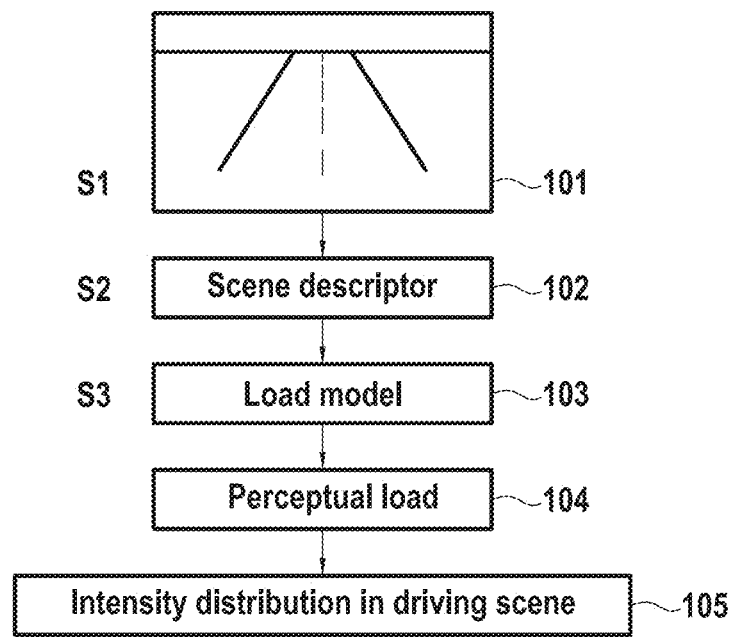
FIG. 2 shows a schematic flow chart illustrating an exemplary method of determining the perceptual load and the load's spatial and temporal intensity distribution across the sensed driving scene according to embodiments of the present disclosure.

FIG. 2 shows a schematic flow chart illustrating an exemplary method of determining the perceptual load and the load's spatial and temporal intensity distribution across the sensed driving scene according to embodiments of the present disclosure. The method comprises essentially two steps: In the first step (step S2), a set of scene features is extracted from the video. In the second step (step S3), the load model providing a mapping function is applied. In other words, a mapping function between the sets of scene features and perceptual load values is applied.

In more detail, it is at first provided a record of a visual driving scene in step S1. As described above, the visual driving scene is recorded by a sensor, in particular a digital camera. From the output of the sensor (e.g. a video stream) fixed duration video snippets 101 (e.g. 2 second long clips) are taken. Hence, the video snippets may be processed in the method of FIG. 2 consecutively.

In step S2 a set of scene features 102 (also referred to as a scene descriptor) is extracted from the current video snippet 101. As described in more detail in the following, the set of scene features may be expressed by a feature vector.

In step S3 the set of scene features 102 is passed through the load model 103, which may be a regression model learnt from crowdsourcing. As a result a perceptual load value 104 indicating the perceptual load of the video snippet 102 is obtained.

The method of FIG. 2 may be repeated for every single video snippet.

The method of FIG. 2 may be obtained using different regression models.

The determination of the perceptual load may also be regarded as an estimation, as it is not necessarily completely precise.

Subsequently, the spatial and temporal intensity distribution 105 of the perceptual load across the sensed driving scene is determined. This may be done by a mapping step (not shown) which maps the perceptual load to the driving scene.

Figure 3:
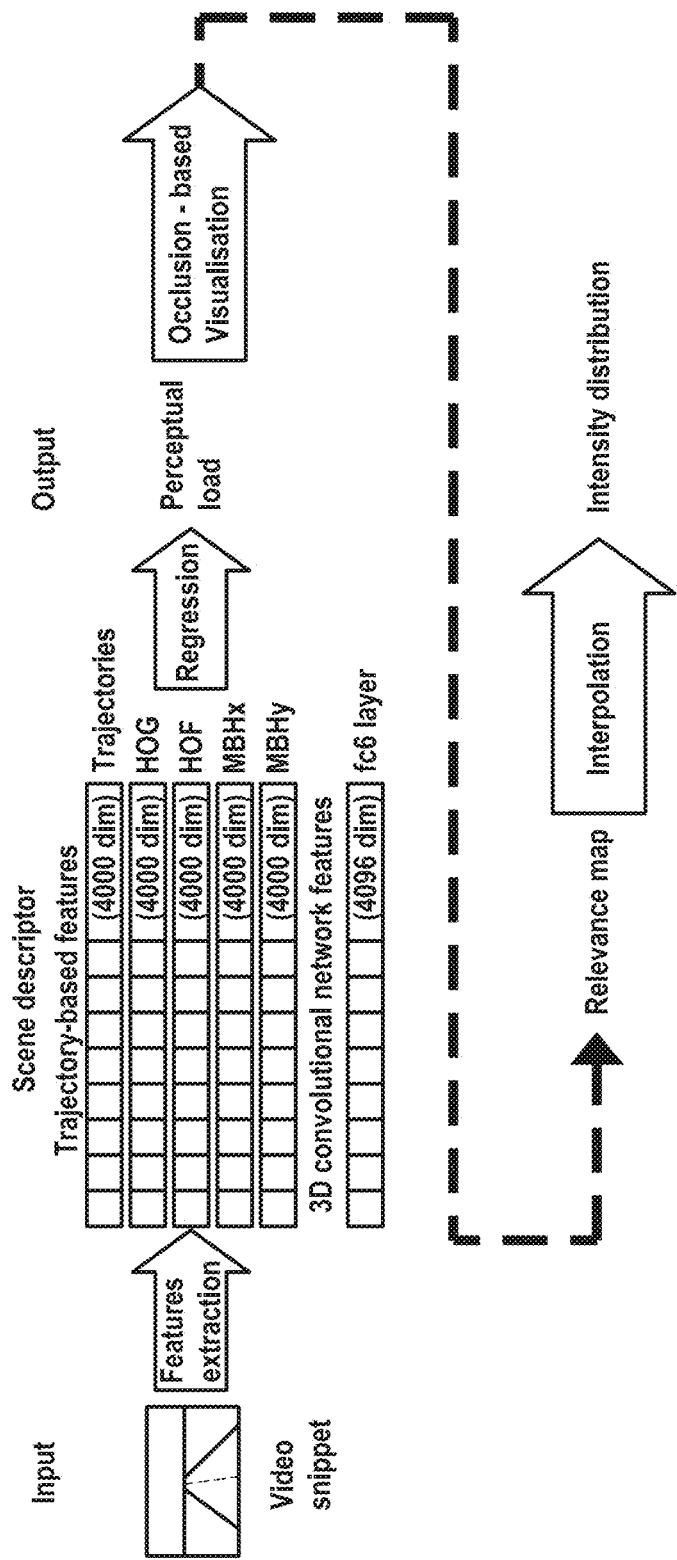
FIG. 3 shows a flow chart illustrating the exemplary method of FIG. 2 in more detail.

FIG. 3 shows a flow chart illustrating the exemplary method of FIG. 2 in more detail. In particular, the set of extracted scene features is shown in more detail, as it will be described in more detail in the following.

The goal of scene feature extraction is to describe the content of a video in a fixed-length numerical form. A set of scene features may also be called a feature vector. The visual information of the driving scene contributes to determine the perceptual load by extracting appearance and motion features of the visual driving scene. In order to extract the visual information, improved dense trajectory (IDT) features and 3D convolutional (C3D) features are desirably extracted from the video snippet, as it is described below. Such features constituting a set of scene features are then passed through the load model, which may be a regression model, in order to calculate a perceptual load value indicating the perceptual load of the video snippet. The perceptual load value is then mapped to the sensed driving scene, e.g. by an occlusion-based visualization technique. In particular, the mapping may be done by determining the relevance of a predetermined spatial and temporal portion (i.e. extract) of the driving scene to the perceptual load value, said relevance representing the perceptual load of said spatial and temporal portion. The resulting relevance map may subsequently be interpolated. The relevance map serves to indicate a spatial and temporal intensity distribution of the perceptual load across the sensed driving scene.

Improved Dense Trajectories (IDT)

In improved dense trajectories, videos are represented as visual features extracted around trajectories of primitive interest points. Trajectories are the tracked (x,y) image location of "interest points" over time. Such "interest points" may be parts of an image which are salient or distinct, such as corners of objects. The interest points may be detected using the SURF ("Speeded Up Robust Features") algorithm and may be tracked by median filtering in a dense optical flow field of the video.

Figure 4:
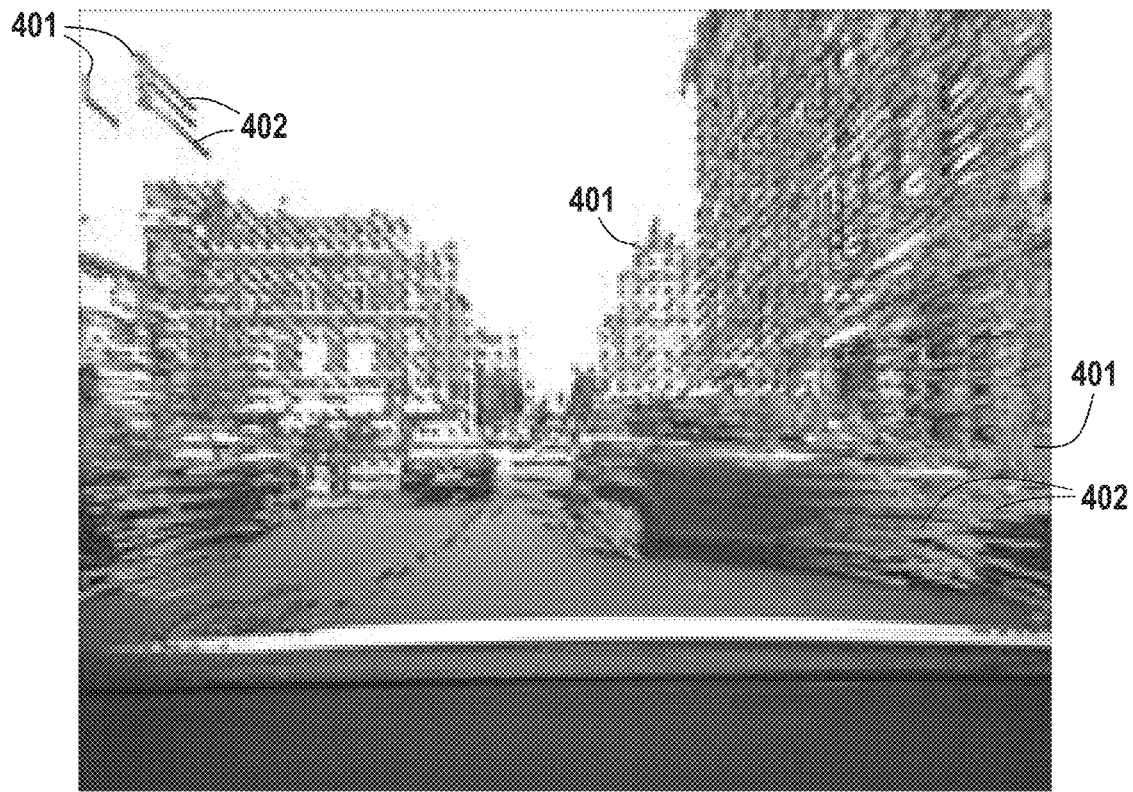
FIG. 4 shows an example of scene feature extraction according to embodiments of the present disclosure.

FIG. 4 shows an example of a scene feature extraction according to embodiments of the present disclosure. Example trajectories are shown in FIG. 4. The points 401 indicate their current position, and the trails 402 indicate their previous locations.

Figure 5:
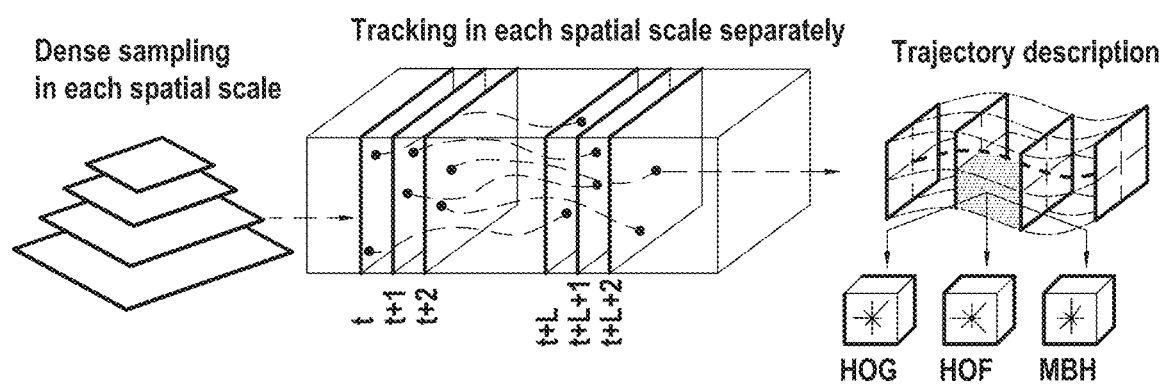
FIG. 5 shows a schematic diagram of dense trajectory extraction of a visual scene by dense trajectories.

FIG. 5 shows a schematic diagram of dense trajectory extraction of a visual scene by dense trajectories. As shown, dense trajectories are extracted for multiple spatial scales, e.g. 4 to 8 spatial scales, and then local features are computed within a space-time volume around the trajectory. Such an action recognition by dense trajectories is also described in Wang, H. and Schmid, C. (2013): "Action recognition with improved trajectories", IEEE International Conference on Computer Vision, Sydney, Australia, which disclosure is incorporated herein in its entirety. Spatial scales commonly refers to the sampling for the trajectories. It means that the trajectories are sampled across the image with different numbers of pixels in between them. For example, at scale 1 there is a spacing of 5 pixels, at scale 2 there is a spacing of 10 pixels etc.

Histograms of Oriented Gradients (HOG), Histograms of Optical Flow (HOF), and Motion Bounded Histograms (MBH) features in the x- and y-directions are extracted around each trajectory, in addition to the Trajectory features themselves (i.e. the normalized x,y location of each trajectory).

A Bag of Words representation is desirably used to encode the features. In the Bag of Words representation, a 4000-length dictionary of each trajectory feature type (Trajectory, HOG, HOF, MBHx, MBHy) is learnt. That is, every possible feature type is quantized into a fixed vocabulary of 4000 visual words, and a video is then encoded as a histogram of the frequency of each type of visual word. This results in a 20,000 dimensional feature vector (i.e. 5×4000-length feature vectors).

Convolutional 3D (C3D) Features

Convolutional 3D (C3D) features are a type of "deep neural network" learnt feature where features are automatically learnt from labelled data. A hierarchy of video filters are learnt which capture local appearance and motion information. A C3D network for feature extraction must first be trained before it can be used. A pre-trained network can be used (i.e. it has been trained on other data, and learns to extract generic video descriptors). For example the pre-trained model may be trained from a set of a million sports videos to classify sports. This learns generic motion/appearance features which can be used in any video regression/classification task. Alternatively or additionally for the training the labelled reference videos may be used, in order to fine-tune a C3D network.

Figure 6:
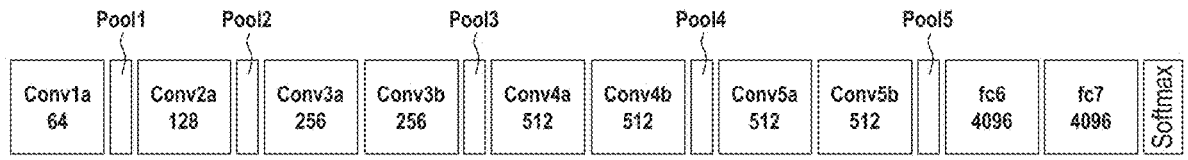
FIG. 6 shows a diagram illustrating the C3D system architecture according to embodiments of the present disclosure.

FIG. 6 shows a diagram illustrating the C3D system architecture according to embodiments of the present disclosure. In the diagram 'Conv' represents a layer of convolutional video filters; 'Pool' represents max-pooling which subsamples the convolution output; and 'FC' represents a fully connected layer which maps weighted combinations of features to output values. The final set of scene features comprises 4096 dimensions and represents a weighted combination of video filters that represents the motion and appearance of the video snippet. Convolutional 3D (C3D) features are also described in Tran, D., Bourdev, L., Fergus, R., Torresani, L., and Paluri, M. (2015): "Learning spatiotemporal features with 3d convolutional networks", IEEE International Conference on Computer Vision, pages 4489-4497, which disclosure is incorporated herein in its entirety.

Figure 7:
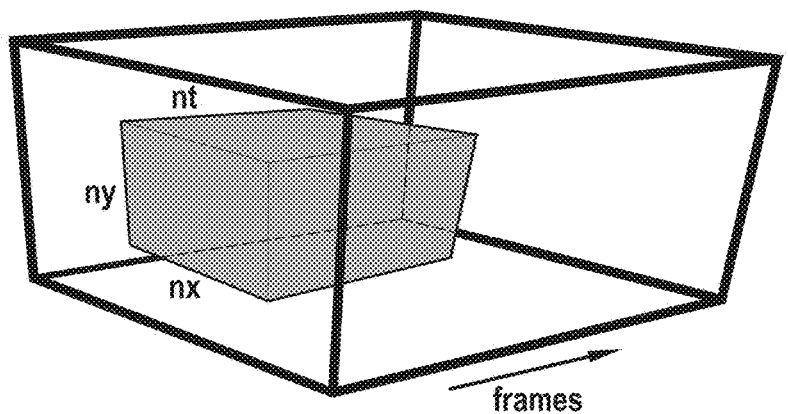
FIG. 7 shows a schematic representation of an occlusion-based visualisation method according to embodiments of the present disclosure.

FIG. 7 shows a schematic representation of an occlusion-based visualisation method according to embodiments of the present disclosure.

The large cuboid represents a video snippet (i.e. a sensed driving scene) in terms of a volume (or, equivalently image frames in time). A smaller mid-gray cuboid of dimension nx*ny*nt is placed within the video, overwriting the original video information. The resulting occluded video is run through the trained perceptual load prediction model. A relevance map of the video can then be created by repeating this process with the occluding cuboid placed at different positions in the video cuboid. For example it may be set nx=ny=150 pixels and nt=15 frames.

In more detail, for obtaining the relevance map the approach of Zeiler and Fergus may be extended for visualising instance-specific importance maps to the domain of video, cf.:

M. D. Zeiler and R. Fergus "Visualizing and understanding convolutional networks", in ECCV, Springer, 2014.

Accordingly, information is systematically removed from the video by replacing a cubic spatio-temporal region of the video with a mid-grey box (see FIG. 7), and it is determined how the resulting perceptual load varies. For example, if a region is removed from the video and results in lower regressed load, it implies that the area contains information indicative of high perceptual load. Hence, it is possible to map the perceptual load to the sensed driving scene, even if the perceptual load consists of only one value.

Accordingly, the occlusion of a spatio-temporal region may be done by changing it to 'gray' (i.e. visual information is deleted from this spatio-temporal region).

In an exemplary mapping (i.e. visualization) method 6000 occluded videos are generated, with the occlusion being centred at equally spaced points in each dimension (points sampled in each x*y*t dimension: 20*20*15). A visualisation video volume is then generated by linearly interpolating the computed model estimates to the full resolution of the original video. Results of this procedure for some demanding driving situations can be seen in FIGS. 8A and 8B. In other words, in the example 6000 'measurements' of perceptual load at specific points in the video cube are obtained. To get the full spatial and temporal resolution (which is higher than the combined 6000 measurements), interpolation is used to fill in the blanks between the measurements.

Figure 8A:
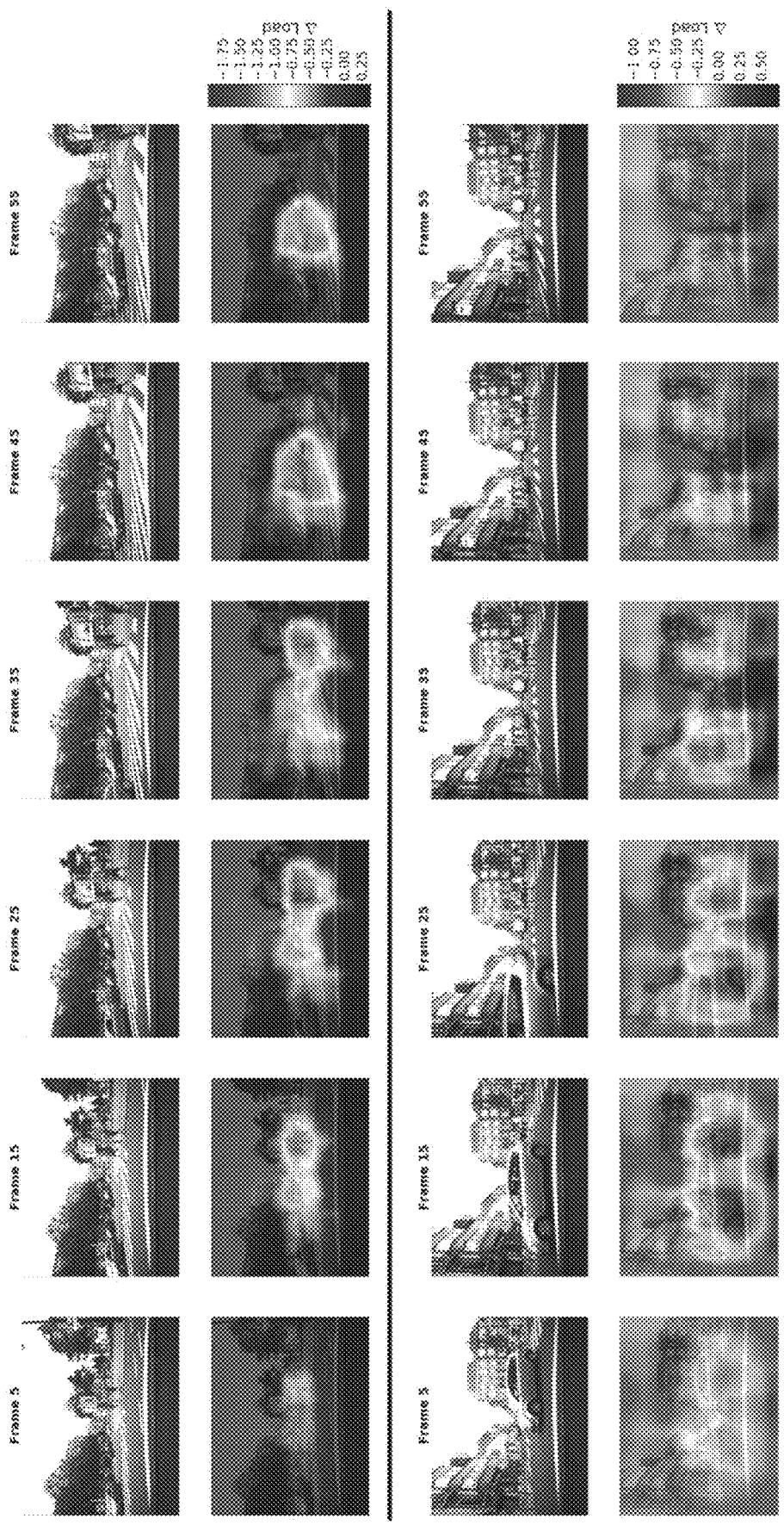
FIGS. 8A and 8B show examples of spatial and temporal intensity distribution of the perceptual load (perceptual demand maps through video frames) according to embodiments of the present disclosure.
Figure 8B:
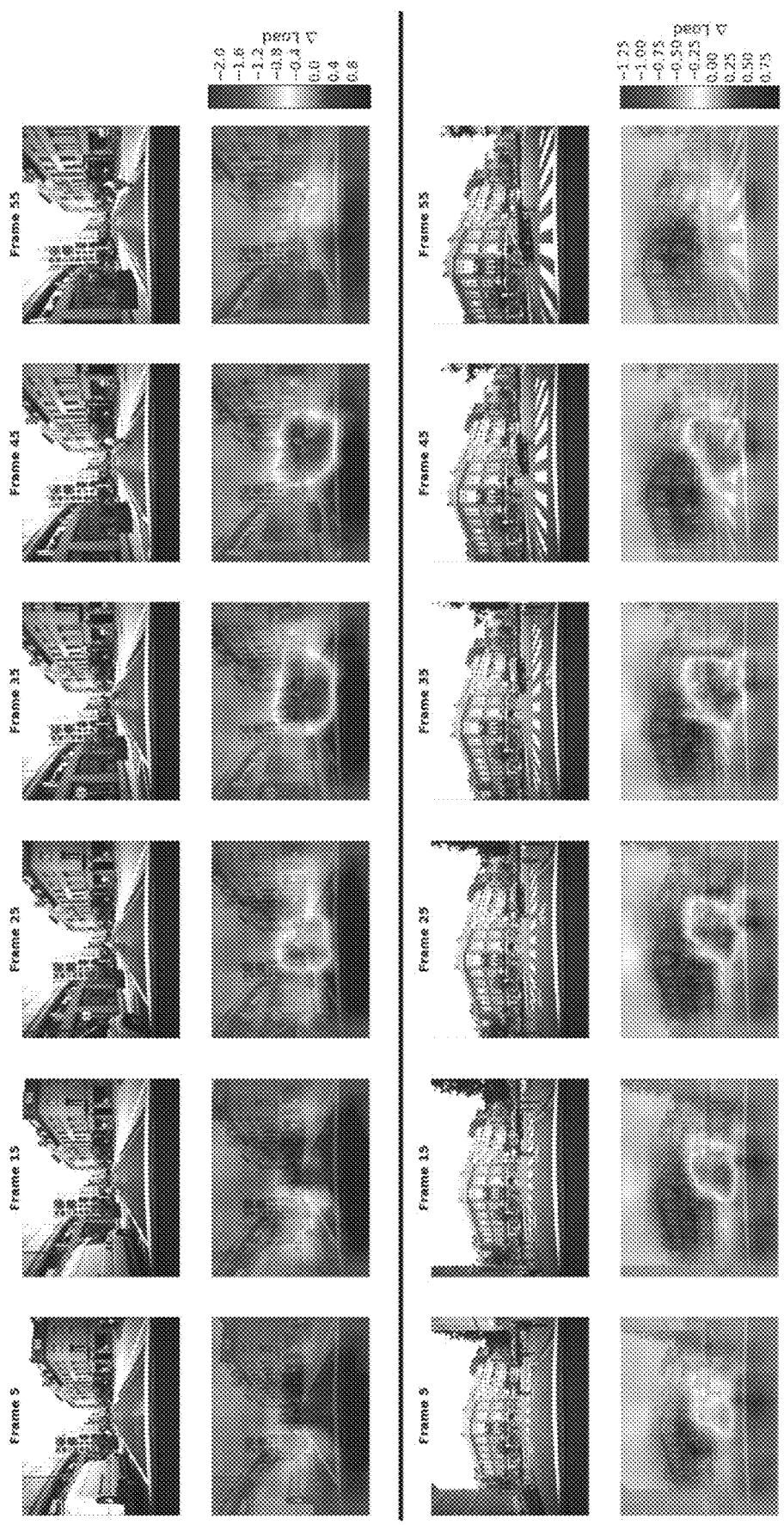

FIGS. 8A and 8B show examples of spatial and temporal intensity distribution of the perceptual load (perceptual demand maps through video frames) according to embodiments of the present disclosure.

From FIGS. 8A and 8B it is evident that the model's prediction in these high load settings is dependent on information which is intuitively demanding in a driving situation. For example, situations where a car crosses the path of the driver, or pedestrians approach a pedestrian crossing, critically require that the driver attend to, perceive, and potentially react to these events. An interesting point to note here is that the model has learned to identify these key driving concepts of car and pedestrian purely from regressing to ground-truth TrueSkill perceptual load estimates, in a weakly supervised fashion.

Training the Load Model

Figure 9:
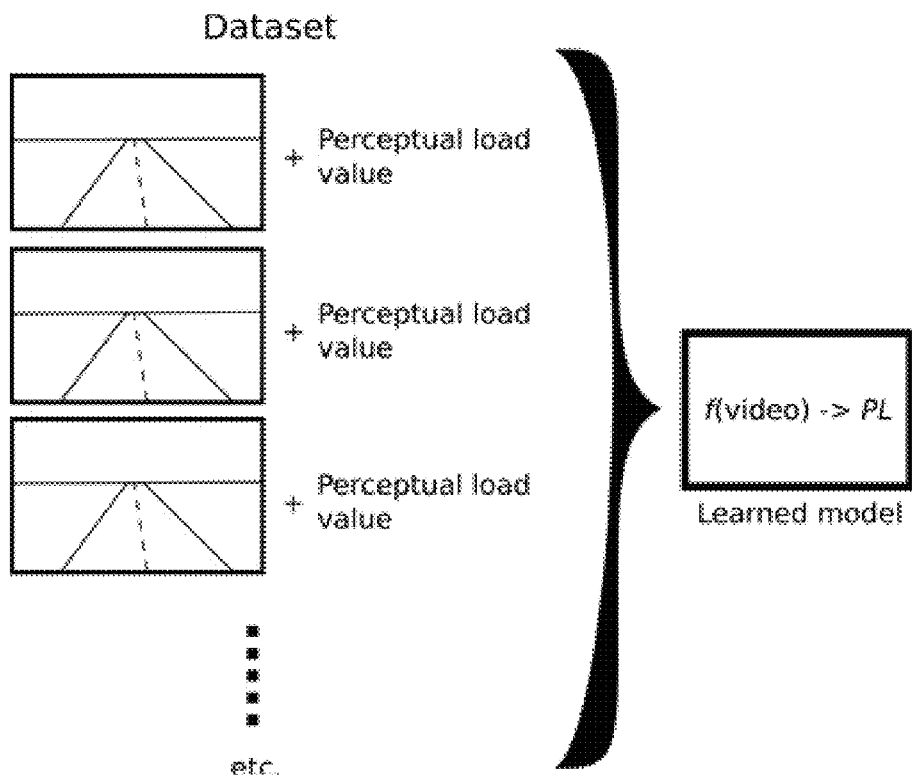
FIG. 9 shows a schematic diagram illustrating the training of the load model according to embodiments of the present disclosure.

FIG. 9 shows a schematic diagram illustrating the training of the load model according to embodiments of the present disclosure. The load model is desirably a regression model. To train the regression model, examples of various driving scenarios, i.e. in particular the reference video scenes, and their corresponding load values are required so that the machine-learning algorithm can learn a mapping function from sets of scene features to perceptual load values.

So called "ground-truth" perceptual load values may be acquired through crowd-sourcing, where test persons, e.g. experienced drivers, watch and compare clips of driving footage in a pairwise-comparison regime which are then converted to video ratings. Pairwise comparisons provide a reliable method of rating items (compared to people assigning their own subjective load value which would provide inconsistent labels). Desirably a system is used where experienced drivers would label the relative perceptual load of videos and select which video from a pair is more demanding on attention to maintain safe driving. The collection of pairwise comparisons is desirably converted to ratings for each video using the TrueSkill algorithm.

An alternative method could be done by a driver and a passenger who manually tag live streams by load value (a level of 1 to 5 for example) while driving for a long distance. During this test, also the load model might be trained. Accordingly, the live streams may be used as reference video scene, with which the load model is trained.

Figure 10:
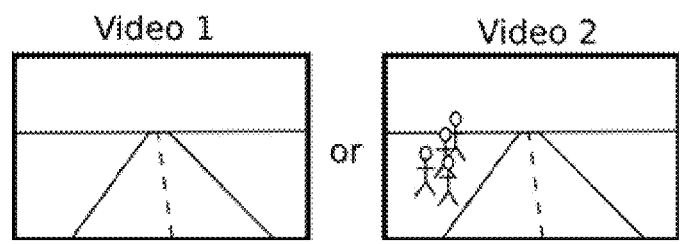
FIG. 10 shows an example of the labelling procedure to compare a pair of reference video scenes, which is subsequently fed into the TrueSkill algorithm.

FIG. 10 shows an example of the labelling procedure to compare a pair of reference video scenes, which is subsequently fed into the TrueSkill algorithm.

The TrueSkill model assumes that each video has an underlying true load value. The probability of one video being ranked as higher load than another is based on the difference in their load values. After each comparison between a pair of videos, the video load values are updated based on which video was labeled as having higher load and their prior load value. All videos start off as having equal load values, and are updated after each comparison. The videos are compared until their corresponding load values no longer change. The final result is a load value for each video. The TrueSkill algorithm is also described in Herbrich, R., Minka, T., and Graepel, T. (2006): "Trueskill: A Bayesian skill rating system", Advances in Neural Information Processing Systems, pages 569-576, which disclosure is incorporated herein in its entirety.

In the following the development of the load model being a regression model is described. Regression takes a fixed length feature vector (i.e. a set of scene features) and learns a mapping function to transform this to a single continuous output value (i.e. the labelled perceptual load of the reference video). The regression function is learnt from labelled training examples of input (i.e. the feature vector) and output (i.e. the labelled perceptual load values) pairs, and finds the function that best fits the training data.

Various types of regression models can be used, e.g. linear regression, kernel regression, support vector regression, ridge regression, lasso regression, random forest regression etc.

In the simplest case of linear regression, the input scene feature vector x, which is effectively a list of numbers $\{x_1, x_2, x_3, \ldots, x_N\}$, is mapped to the output y (in our case the perceptual load value) through a linear function y=f(x), where the function is a weighted sum of the input numbers:

$$f(x)=w^T x+b \text{—that is } f(x)=w_1{}^*x_1+w_2{}^*x_2+w_3{}^*x_3 \ldots +b.$$

This is equivalent to fitting a line of best fit to the input data points, and will learn the parameters w (these are simply weights assigned to each feature/value/number in the feature vector, x) and a bias term b, which centers the output at a particular value.

In a better performing model, multi-channel non-linear kernel regression is used. This extends linear regression to cover complex non-linear relationships between input sets of scene-features and output load values through using a "kernel". This is a transformation of the input feature vectors to a space where they can be better separated or mapped. The mapping function becomes:

$$f(x)=w^T \phi(x)+b.$$

Then, regression is run in the combined kernel space. This is similar to fitting a line to 2D points, but in high dimensional space: a machine-learning algorithm finds the collection of weights, w, which minimizes the error in the perceptual load estimate on a 'training-set' (i.e. a subset of the whole dataset, in this case two thirds of the ~2000 video-load value pairs). This optimal set of weights therefore defines the mapping that best transforms the set of scene features to a single value indicating the perceptual load.

In this way the load model comprising the regression function can be trained based on the training examples. Once the regression function is learnt, the same procedure may be run, when the control device is used in the vehicle. Accordingly, in use of the control device, an input scene descriptor (i.e. a set of scene features) is extracted from a visual driving scene, and the regression function is applied on the input scene descriptor (i.e. the set of scene features), in order to calculate the output load value.

After learning the model, any video can be inserted and a perceptual load value will be output for every 2-second segment. A "sliding window" approach is used to provide a continuous output the perceptual load value (i.e. a value can be output for every frame of the video). Of course, the segment may also be shorter or longer than 2 seconds.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A control device for a vehicle for determining a perceptual load of a visual and dynamic driving scene on a driver, the perceptual load on the driver corresponding to an amount of load on a brain of a driver to fully perceive temporal portions and spatial portions of the visual and dynamic driving scene, and the perceptual load being based only on a predetermined load model configured to determine the perceptual load of the visual and dynamic scene without any measures of driver behavior while they drive, the predetermined load model being trained on pairwise comparison with an experienced test driver selecting which reference video from a pair of reference videos is more demanding on driver attention and assigning the selected reference video a higher load value, the control device being configured to:
 receive a sensor output of a sensor, the sensor sensing the visual driving scene,
 extract a set of scene features from the sensor output, the set of scene features representing static and dynamic information of the visual driving scene,
 determine the perceptual load of the set of extracted scene features based on the predetermined load model,
 the load model being predetermined based on reference video scenes each being labelled with a load value,
 map the perceptual load to the sensed driving scene, and
 determine a spatial and temporal intensity distribution of the perceptual load across the sensed driving scene.

2. The control device according to claim 1, wherein the load model comprises a mapping function between sets of scene features extracted from the reference video scenes and the load values.

3. The control device according to claim 1, wherein the load model is configured to map a set of scene features to a perceptual load value.

4. The control device according to claim 1, wherein the load model is a regression model or a classification model between the sets of scene features extracted from the reference video scenes and the load values.

5. The control device according to claim 1, wherein the mapping of the perceptual load to the sensed driving scene comprises determining the relevance of at least one predetermined spatial and temporal extract of the sensed driving scene to the perceptual load value of said scene and mapping the determined relevance to said predetermined spatial and temporal extract.

6. The control device according to the preceding claim 5, wherein the determination of the relevance of the predetermined spatial and temporal extract is done by occluding the extract in the sensed driving scene and comparing the determined perceptual load of the original sensed driving scene with the determined perceptual load of the sensed driving scene having the extract occluded.

7. The control device according to claim 5, wherein the determination of the spatial and temporal intensity distribution comprises assembling a plurality of predetermined spatial and temporal extracts of different positions in the driving scene such that the original sensed driving scene is reconstructed, the assembling in particular includes interpolating the extracts to the full resolution of the original sensed driving scene.

8. The control device according to claim 1, configured to continuously train the load model by monitoring the driver during the driving scene, wherein a monitored behavior of the driver during the driving scene not matching the determined perceptual load serves to on-line up-date said mapping function.

9. The control device according to claim 1, wherein the set of scene features comprises a range of spatio-temporal features, the set of scene features being in particular described in vector form.

10. The control device according to claim 1, wherein the set of scene features comprises improved dense trajectory (iDT) features or 3-dimensional convolutional neural network (C3D) features.

11. The control device according to claim 1, wherein the load model is a linear regression model, wherein the set of scene features being an input scene feature vector x is mapped to the perceptual load being an output perceptual load value $y=f(x)$ through a linear mapping function $f(x)= w^T x + b = w_1 * x_1 + w_2 * x_2 + w_3 * x_3 \ldots + b$, the function being a weighted sum of the input dimension values of the feature vector x, wherein weighted parameters w are assigned to each dimension value in the feature vector x and a bias term b centers the output at a particular value, or
 the load model is a multi-channel non-linear kernel regression model, where the mapping function is $f(x) = w^T \phi(x) + b$, wherein $\phi(x)$ is a transformation function of the input feature vectors to a non-linear kernel space.

12. A vehicle comprising:
 a control device according to claim 1.

13. The vehicle according to claim 12, further comprising:
 a sensor configured to sense the visual driving scene, the sensor being in particular an optical sensor, more in particular at least one digital camera.

14. The vehicle according to claim 12, the vehicle being configured for at least partially automated driving control, wherein the control device is used in a pre-processing step to identify portions with increased perceptual load in the sensed driving scene based on which the automated driving is controlled.

15. The vehicle according to claim 14, the vehicle comprising hardware and software resources configured for the at least partially automated driving control, wherein the hardware and software resources are allocated to process the portions with increased perceptual load in prioritized manner.

16. The vehicle according to claim 14, the vehicle comprising a human-machine-interface configured to output to human the portions with increased perceptual load.

17. A system for a vehicle for determining the perceptual load of a visual and dynamic driving scene, the system comprising:
 a control device according to claim 1, and
 a server comprising a processor configured to determine the load model.

18. The system according to claim 17, wherein the processor is configured to:
 store a plurality of reference video scenes,
 provide labelling for the reference video scenes with load values,
 extract a set of scene features from each reference video scene, and
 determine the load model based on a regression analysis configured to determine a mapping function between the sets of scene features extracted from the respective reference video scenes and the load values.

19. The system according to claim 17, wherein the processor is configured to:
 provide a human based load rating of the reference video scenes, in particular the load rating being based on crowdsourcing, wherein the load values are determined based on the human based load rating.

20. The control device according to claim 1, wherein the visual driving scene is an outdoor visual driving scene corresponding to an external environment of the vehicle.

21. A method of determining the perceptual load of a visual and dynamic driving scene on a driver, the perceptual load on the driver corresponding to an amount of load on a brain of a driver to fully perceive temporal portions and spatial portions of the visual and dynamic driving scene, and the perceptual load being based only on a predetermined load model configured to determine the perceptual load of the visual and dynamic scene without any measures of driver behavior while they drive, the predetermined load model being trained on pairwise comparison with an experienced test driver selecting which reference video from a pair of reference videos is more demanding on driver attention and assigning the selected reference video a higher load value, the method comprising the steps of:

receiving a sensor output of a sensor, the sensor sensing the visual driving scene, extracting a set of scene features from the sensor output, the set of scene features representing static and dynamic information of the visual driving scene, determining the perceptual load of the set of extracted scene features based on the predetermined load model, the load model being predetermined based on reference video scenes each being labelled with a load value, mapping the perceptual load to the sensed driving scene, and determining a spatial and temporal intensity distribution of the perceptual load across the sensed driving scene.

22. The method according to claim 21, wherein the determination of the load values of the reference video scenes is human based, in particular based on crowdsourcing.

23. The method according to claim 21, wherein the load model is continuously trained by monitoring the driver during the driving scene, wherein a monitored behavior of the driver during the driving scene not matching the determined perceptual load serves to on-line up-date said mapping function.

24. The method according to claim 21, wherein a processor of a server is configured to perform the steps of:

storing a plurality of reference video scenes, providing labelling for the reference video scenes with load values, extracting a set of scene features from each reference video scene, and determining the load model based on a regression analysis which determines a mapping function between the sets of scene features extracted from the respective reference video scenes and the load values.

25. The method according to claim 24, wherein the processor is configured to provide for a human based load rating of the reference video scenes, in particular the load rating being based on crowdsourcing, wherein the load values are determined based on the human based load rating.

26. The method according to claim 21, wherein the visual driving scene is an outdoor visual driving scene corresponding to an external environment of the vehicle.

* * * * *